United States Patent
Anderberg

(10) Patent No.: US 8,302,972 B2
(45) Date of Patent: Nov. 6, 2012

(54) SEALING SYSTEM FOR JOINTS

(75) Inventor: Goran Anderberg, Landskrona (SE)

(73) Assignee: Huhnseal AB, Landskrona (SE)

( * ) Notice: Subject to any disclaimer, the term of this patent is extended or adjusted under 35 U.S.C. 154(b) by 561 days.

(21) Appl. No.: 11/666,743

(22) PCT Filed: Sep. 21, 2005

(86) PCT No.: PCT/SE2005/001388
§ 371 (c)(1), (2), (4) Date: Jun. 6, 2008

(87) PCT Pub. No.: WO2006/033625
PCT Pub. Date: Mar. 30, 2006

(65) Prior Publication Data
US 2008/0258400 A1     Oct. 23, 2008

(30) Foreign Application Priority Data
Sep. 23, 2004 (SE) ................................. 0402294

(51) Int. Cl.
*F16L 17/06* (2006.01)
(52) U.S. Cl. ......... 277/608; 277/626; 277/638; 277/644
(58) Field of Classification Search .............. 277/606, 277/608, 626, 204, 644, 638, 604
See application file for complete search history.

(56) References Cited

U.S. PATENT DOCUMENTS

| | | | |
|---|---|---|---|
| 2,642,016 A | 6/1953 | Thalmann | |
| 2,953,398 A * | 9/1960 | Haugen et al. | 277/625 |
| 3,040,669 A * | 6/1962 | Rupp | 415/201 |
| 3,095,821 A * | 7/1963 | Elenbaas | 415/200 |
| 3,110,471 A * | 11/1963 | Kuhles | 251/318 |
| 3,507,520 A * | 4/1970 | Hubscher et al. | 285/110 |
| 3,537,731 A * | 11/1970 | Reddy | 285/110 |
| 3,854,761 A | 12/1974 | David | |
| 4,078,813 A * | 3/1978 | Bram | 277/616 |
| 4,089,533 A * | 5/1978 | Knudson | 277/436 |
| 4,298,184 A * | 11/1981 | Grunert et al. | 251/357 |
| RE34,874 E * | 3/1995 | Newman et al. | 277/625 |
| 5,462,289 A | 10/1995 | Anderberg | |
| 6,070,911 A * | 6/2000 | Namikawa et al. | 285/48 |
| 6,179,141 B1 * | 1/2001 | Nakamura | 215/352 |
| 2005/0253383 A1 * | 11/2005 | Gibb et al. | 285/112 |

FOREIGN PATENT DOCUMENTS

| | | | |
|---|---|---|---|
| GB | 742213 | | 12/1955 |
| GB | 1544909 | | 4/1979 |
| JP | 2007040416 A | * | 2/2007 |
| WO | WO 9837352 | | 8/1998 |

* cited by examiner

*Primary Examiner* — Shane Bomar
*Assistant Examiner* — Robert E Fuller
(74) *Attorney, Agent, or Firm* — Larson & Larson, P.A.; Frank Liebenow; Justin Miller

(57) ABSTRACT

A gasket (1) and seat (2) system for sealing a joint, such as flanges (3, 4), tube or pipe couplings, housings, shafts, is disclosed. The gasket (1) comprises according to one embodiment an inner portion (10), with a wall (17) facing an interior of the coupling and an outer portion (11), which extends axially forming radial end walls (12, 13). The inner portion (10) of the gasket (1) is formed with an angled wall (18), making the inner portion (10) expand inwards, which angled wall (18) interacts with a matching angled wall (25) of the seat (2), such that the joint has provisions for increasing the sealing ability in cases with increased pressure in the coupling. In an embodiment, the gasket may further have the wall (17) facing the interior being adapted to be flush with an interior surface (26) when mounted in the seat and may also have provisions for heat expansion and elevated pressures, in order to remain flush with the coupling at elevated temperatures and in order to ensure sealing at elevated pressures.

14 Claims, 4 Drawing Sheets

SEALING SYSTEM FOR JOINTS

FIELD OF THE INVENTION

The present invention generally relates to a sealing system for substantially immovable joints of two elements, and more specifically to a gasket and seat system for sealing between substantially immovable joints such as flanges, tube or pipe couplings, housings, shafts, etc. Preferably, the system provides a hygienic sealing with a smooth surface to a product provided within the joint elements and which also handles volumetric changes in the rubber caused by temperature changes, and preferably the system provides a sealing that in addition tolerates increased pressure conditions on the sealing system without degrading its sealing performance.

BACKGROUND OF THE INVENTION

A gasket and seat system of the kind described above is for example shown in DE-A-42 01 535. The sealing according to this system will provide a gasket being flush with the interior surfaces of the pipes and it has some provisions for heat expansion.

Gasket and seat systems that provide gaskets flush-mounted with the interior surfaces of pipes are for example desired in the pharmaceutical and food industry. For instance, the ISO 2852 standard of 1993 defines stainless steel pipe couplings for the food industry, wherein a gasket is disclosed as a ring-shaped pipe coupling part intended to make a hygienic liquid-tight joint between the flanges of two clamp liners. This kind of sealing system is intended to prevent residue and bacteria from accumulating in pipe joints, especially e.g. in crevices of the sealing system. The pipes of these facilities are regularly cleaned by CIP (Cleaning In Place) and SIP (Sterilization In Place) with hot steam (140° C.) in order to kill bacteria that may be present in the pipes. This means that the gaskets must be able to handle heat expansion while remaining flush, or almost flush, with the interior surfaces of the pipes even during steam washing. If the gaskets project from the pipe interior, they can further induce turbulence in the pipes and this may be unwanted in some cases. The gasket disclosed in ISO 2852 does not have provisions against such expansion into the pipe interior caused by a difference in the expansion coefficients of the pipe material and the gasket material. Furthermore, the same problem applies to other types of joints than pipe couplings, having similar sealing purposes, for instance a heat exchanging system for heating a product inside a pipe. In this case different operating temperatures cause a different amount of expansion during operation. The sealing has to cope with these varying operating conditions without causing undesired crevices, as explained above.

With a gasket and seat system of the known kind, there is no provision for improving the sealing ability during periods with increased pressure in the pipes. The gasket inner portion is also rather large, which increases the risk of this portion expanding, due to increased heat, into the interior of the pipes. Since the gasket furthermore is symmetrical, machining is necessary in both parts of the coupling in order to form an appropriate seat. The same problems occur with known gasket and seat systems for similar couplings, e.g. in pump housings of food pumps.

Hence, there is a need for a more advantageous sealing system.

SUMMARY OF THE INVENTION

It is an object of the present invention to solve at least the above problems, singly or in any combination, by arranging a gasket and seat system which provides a gasket for a joint, such as a coupling or union of similar elements, such as flanges, tube or pipe couplings, housings, shafts having attached elements thereto, etc, and which has provisions for increasing the sealing ability in cases with increased pressure in the joint, such as a pipe or a coupling.

This object is obtained by the features of the various aspects of the present invention as defined in the attached independent claims. Particular embodiments are given in the dependent claims.

In an embodiment, the gasket may have a wall facing the interior being adapted to be flush with an interior surface when mounted in a seat and may also have provisions for heat expansion, in order to remain flush with the joint elements, as e.g. a pipe or a coupling, at elevated temperatures. Moreover, a pressure applied on to the gasket improves the sealing capability of the gasket and seat system by tightening the gasket using the hydraulic force pressing onto the gasket for improved sealing of the gasket against the counter faces. The gasket may furthermore be self-retaining inside the seat, which simplifies the procedure of coupling the joint elements, e.g. pipes or union elements. In another embodiment, the seat is only formed in one part of the joint, e.g. in one pipe or flange, thus reducing the amount of machining necessary. Yet another embodiment may have a silver ion coating on the gasket for obtaining antiseptic properties.

More particularly, according to one aspect of the invention, a gasket and seat system suitable for sealing a joint is provided. The gasket may be made of a polymeric material comprising an inner portion, with a wall facing an interior of the joint, and an outer portion, which extends axially forming radial end walls, wherein the inner portion of the gasket is formed with an angled wall, making the inner portion expand inwards, which angled wall is configured to interact with a matching angled wall of the seat.

The wall facing the interior of the joint may be adapted to be flush with an interior surface of the joint when mounted in the seat, thus providing a hygienic interior surface not susceptible for contamination.

The wall facing the interior of the joint may be angled slightly inwards from a common point of engagement for the interior surface and the wall.

Furthermore, the gasket may be formed with a groove in the outer portion thereof, and may be formed with angled walls of the outer portion which are compressed upon entry in the seat.

A gasket surface facing a flange plane may be adapted to be flush with the flange plane after assembly.

The gasket may comprise silver ions, in order to obtain antiseptic properties.

The joint may be a pipe coupling that may comprise two flanges, wherein the gasket may be located in one of said flanges only, preferably pre-mounted in said one flange during assembly of said system.

The joint may be comprised in a pump housing of a pump for food processing or pharmaceutical product processing.

According to a further aspect of the invention, a gasket of polymeric material is provided, which gasket is adapted to seal a joint comprising an inner portion, with a wall in use facing an interior of said coupling, and an outer portion, which extends axially forming radial end walls, wherein the inner portion of the gasket is formed with an angled wall, making the inner portion expand inwards, which angled wall is configured to interact with a matching angled wall of the seat.

The polymeric material of the gasket may be elastic and resilient and may comprise rubber materials such as EPDM, Viton®, VMQ, FPM, FKM and HNBR, thermoplastic materials, or compositions comprising such materials singly or in combination.

According to yet a further aspect of the invention, a gasket and seat system as mentioned above, according to the above-mentioned aspect of the invention, is used for hygienically sealing a joint comprising a coupling in a union of coupling elements adapted for food or pharmaceutical processing.

According to another aspect of the invention, a method of assembling a gasket and seat system for sealing a joint according to the above-mentioned aspect of the invention is provided. The method comprises pre-mounting the gasket in one element of the joint, wherein said element comprises said seat, such that assembly of said system is facilitated.

BRIEF DESCRIPTION OF THE DRAWINGS

The invention will be described in further detail below with reference to the accompanying drawings, in which FIG. 1b is a detail view of the gasket within FIG. 1a.

FIG. 6b is a detail view of the gasket within FIG. 6a.

DETAILED DESCRIPTION OF EMBODIMENTS

Figure 1B:
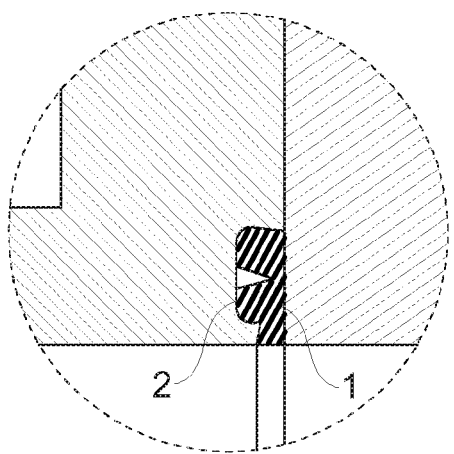
Figure 1A:
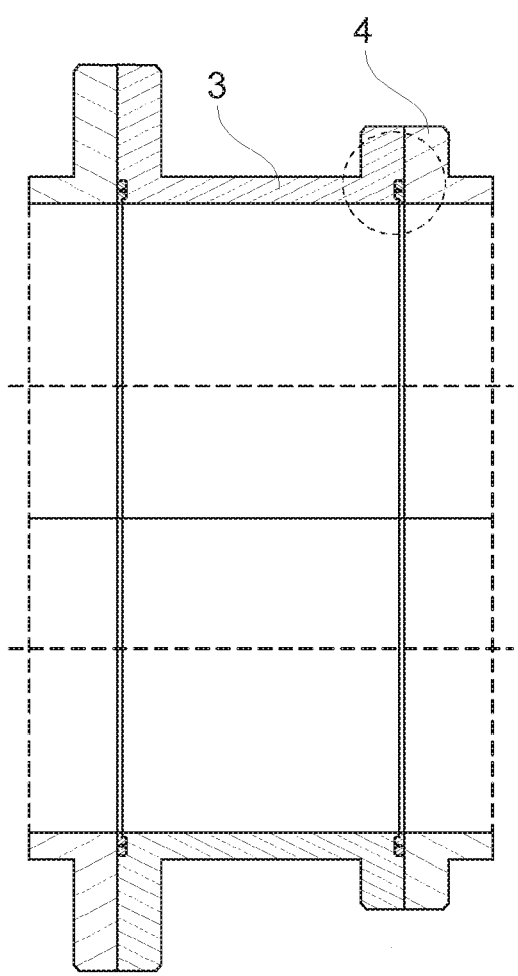
FIG. 1a is a sectional view showing a gasket mounted in a seat of a pipe coupling according to an embodiment of the invention.

A gasket 1, in the present embodiment in the form of a form ring or sealing ring, and seat 2 of an embodiment of the present invention can be seen in FIGS. 1a and 1b arranged in a conventional flange coupling joining two pipes 3, 4, with axially aligned pipes having radially extending flanges.

Figure 2:
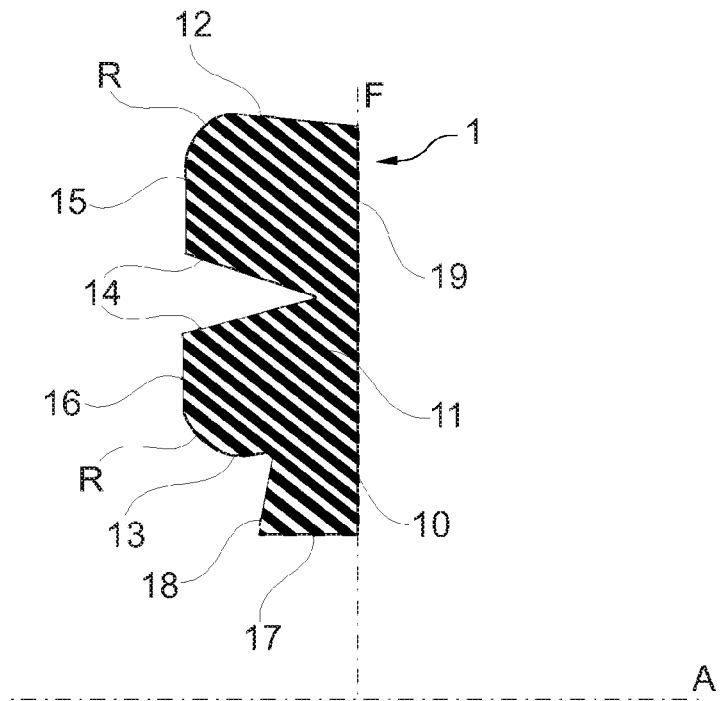
FIG. 2 is an enlarged, sectional view of the gasket in FIGS. 1a-b.

An enlarged view of the gasket 1 is shown in section in FIG. 2. The gasket is made up of two main portions, where an inner portion 10 expands towards the pipe interior at a slight angle and an outer portion 11 extends axially, to the left in FIG. 2, forming radial end walls 12, 13. These walls 12, 13 preferably form an angle with a longitudinal axis A of the pipe to be sealed. A generally axial groove 14 is formed in the outer portion 11, between the radial end walls 12, 13, substantially dividing the outer portion 11 into two hinged halves. The angle between the groove walls or the groove angle is larger than the sum of the angles between the radial end walls 12, 13 and the longitudinal axis A. On either side of the groove 14 are walls 15, 16, which are parallel to a flange plane F. The walls 15, 16 are at their distal ends joined to the outer 12 and inner 13 radial end walls respectively by a radius R of generally equal size. An innermost surface 17 facing the pipe interior is parallel to the longitudinal axis A. An angled wall 18 connects the innermost wall 17 with the inner radial end wall 13. The right side surface 19 is planar and lies in the flange plane F.

Figure 3:
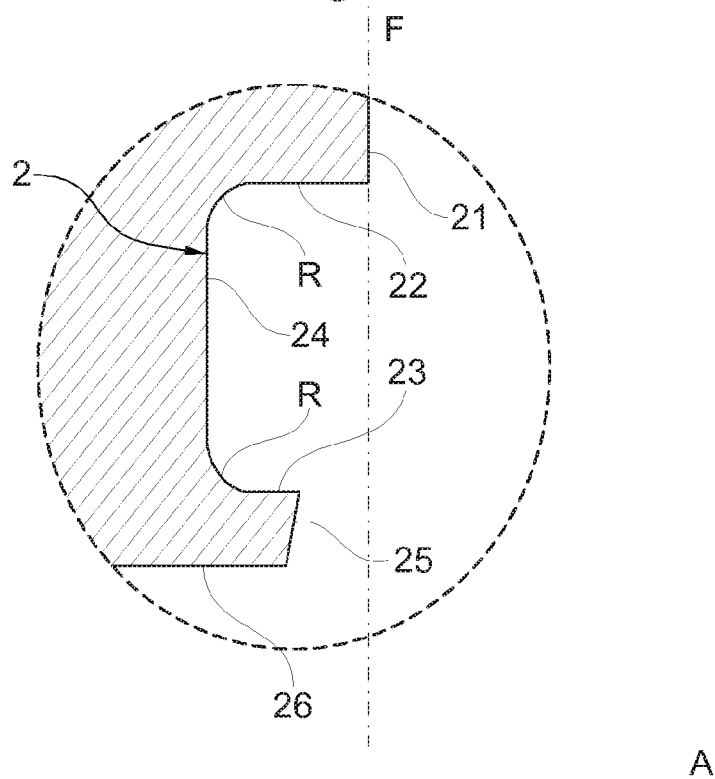
FIG. 3 is an enlarged, sectional view of the seat in FIGS. 1a-b.

In FIG. 3 a matching seat 2 is shown for mounting the gasket 1 of the present invention. A flange wall 21 is part of the flange for joining two pipes and this wall 21 lies in the flange plane F. The seat 2 further has two walls substantially parallel to the axis A, namely an outer seat wall 22 and an inner seat wall 23, respectively. These walls 22, 23 are connected by a wall 24 being substantially perpendicular to said walls 22 and 23. The connections between these walls are formed with a radius R of generally equal size, matching those of the gasket 1. A wall 25 is formed between the inner seat wall 23 and a pipe inner surface 26. This wall 25 is offset to the left from the flange plane F and further forms an angle with the flange plane.

When the gasket 1 of FIG. 2 is fitted in the seat 2 of FIG. 3, the radial end walls 12, 13 are compressed towards the groove 14 formed in the center of the gasket outer portion 11. The groove volume is thus reduced but the groove is not completely compressed, since the groove volume is larger than the sum of the displaced volumes of the radial end walls 12, 13. This compression of the radial end walls 12, 13 ensures that the gasket 1 remains in the seat 2 during assembly of the pipe coupling. The inner portion 10, with the angled wall 18, abuts the slanted inner wall 25 where the inner portion is slightly thicker than the offset between the wall 25 and the flange plane F. This means that the inner portion 11 is compressed slightly during assembly of the pipes and this improves the sealing ability of the gasket 1. The innermost surface of the gasket 17 is now aligned with the inner surface 26 of the pipe. A right side surface 19 of the gasket 1 is aligned with the flange plane F, at least after assembly, and this means that no machining is necessary in the right hand flange.

When the gasket 1 and seat 2 of the above description are subjected to heat, they will expand. However, the thermal expansion of rubber is about seven times as high as that of metal. Therefore, the groove 14 of the gasket's 1 outer portion 11 allows for compensation of this expansion difference and this minimizes the expansion of the gasket 1 to the interior of the pipe. The main purpose of groove 14, when the gasket 1 is assembled in the flange 3 is to compensate for this expansion during thermal changes. Furthermore, the expansion of the gasket inner portion 10 is reduced due to its small size.

An increased pressure in the pipe will lead to an increased sealing pressure of the gasket 1, both axially and radially, since the inwardly expanding inner portion 10 is self-engaging. The pressure against the innermost surface 17 will force the inner portion 10 inwards increasing the pressure between the angled walls 18 and 25, thus improving the sealing ability. Hence, such a pressure applied onto the gasket improves the sealing capability of the gasket 1 and seat 2 system by tightening the gasket 2 using the hydraulic force caused by the pressure and pressing the gasket tighter into its counter sealing surface for improved sealing of the gasket against the counter faces. The inwardly expanding inner portion further reduces the tendency of outward radial displacement towards the outer portion, caused by an increased pressure in the pipe.

The above gasket 1 now seals the flange coupling without presenting any cracks, crevices or protrusions to the interior of the pipe.

The gasket of the present invention may, as mentioned above, be mounted in a hollow joint, such as a pipe flange coupling, only requiring machining in one side of the flange surfaces. The gasket is further self-retaining, which simplifies assembly. This is both cost- and time-effective. Moreover, the gasket provides a way of sealing two pipes, or similar couplings such as two joined elements of pump housings, without presenting any edges or cracks to the interior of the pipe or the coupling, even if the temperature is increased to about 140° C.

The gasket of the present invention may be manufactured from different kinds of polymeric material having elastic and resilient characteristics, e.g. rubber materials such as EPDM, Viton®, VMQ, FPM, FKM and HNBR, thermoplastic materials, or compositions comprising such materials singly or in combination. Care should be taken so the chosen material does not affect the contents in the pipe. If desired, the gasket may be provided with further advantageous properties, for instance it may be covered with a suitable coating, e.g. a silver ion coating if the gasket is to be antiseptic. Further, such materials as e.g. silver ions may be homogenously distributed in the gasket material in order to provide the desired properties. This is advantageously achieved by mixing such additives into the gasket material or by coating the gasket prior to forming and curing the same or by coating the gasket prior to curing the polymeric material. The right hand surface 19 of the gasket 1 is illustrated as being planar, but this is not necessary. If a certain compression of the rubber is wanted, this may be achieved by incorporating a specific profile in this surface 19, which though will be planar after assembly, so that machining of only one part of the coupling for fitting the gasket is necessary.

Figures 4A, 4B:
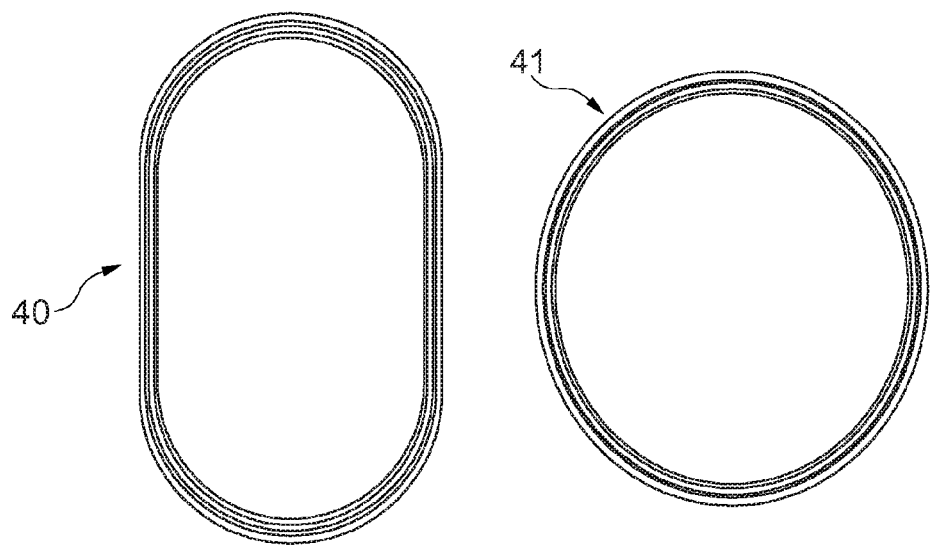
FIG. 4 is a side projection showing two different gasket shapes for joining pipes of matching shape.

The overall shape of the gasket is determined by the shape of the joint, e.g. a pipe coupling, and the gasket will be formed to follow the interior surface of the pipe. In FIG. 4 two different gasket shapes 40, 41 are shown as non-limiting examples.

Figure 5B:
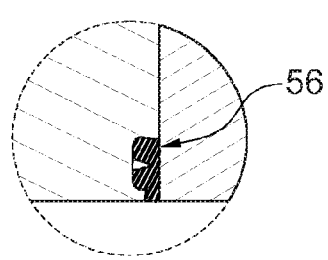
FIG. 5b is a detail view of the gasket within FIG. 5a, FIG. 6a is a sectional view showing a gasket mounted in a shaft-mounted element for radially sealing the shaft and shaft mounted element assembly.
Figure 5A:
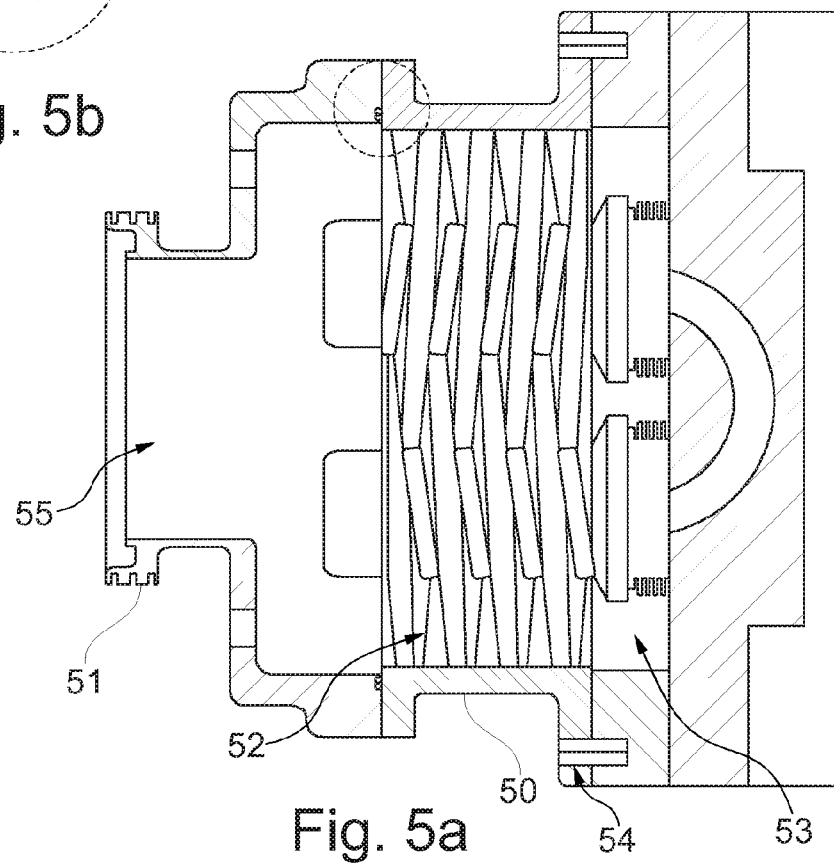
FIG. 5a is a sectional view showing a gasket mounted in a seat of a pump-housing coupling according to another embodiment of the invention.

The gasket and seat system of the present invention is shown in a pipe coupling with parallel interior walls, but may just as well be mounted in conical couplings or joints. It may be used in flange couplings, housings of pumps (see example below), pipe fittings, tube fittings, pipe couplings, and/or union couplings. It may also be used for dairy fittings, joined houses, e.g. of a pump, mechanical sealings, or similar as is evident to a person skilled in the art. The gasket and seat system of the present invention may also be used in heat exchangers, especially in the food and pharmaceutical industry. Non-limiting examples of pump housings are for instance a housing of an eccentric screw pump, which may use a gasket as shown to the right in FIG. 4, or a twin screw pump (see FIGS. 5a and 5b), which may use a gasket having the shape as shown to the left in FIG. 4, for displacement of viscous fluids, such as food. The pump housing 50 is generally built in a pipe system for transporting the fluids therein, e.g. milk products. More precisely, with reference to FIGS. 5a and 5b, the pump housing 50 may comprise a flange coupling 51 to a pipe feeding in the fluid 55 to the pump, as well as a further flange coupling 54 on the other ending of the pump housing, to a pipe or a driving unit 53 for the twin screws 52, into which the pump displaces the fluid fed in from the feeding pipe. Hence, the gasket and seat system may also be located in such a joint having pipe to pump couplings as elements, as described above.

Figure 6B:
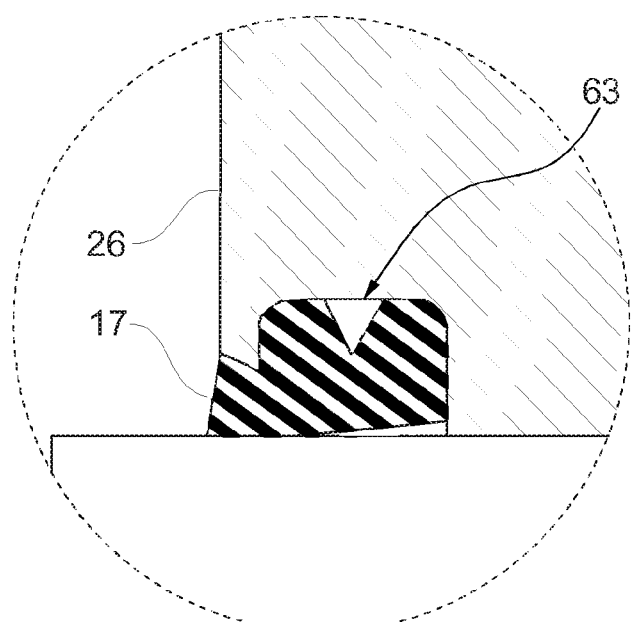
Figure 6A:
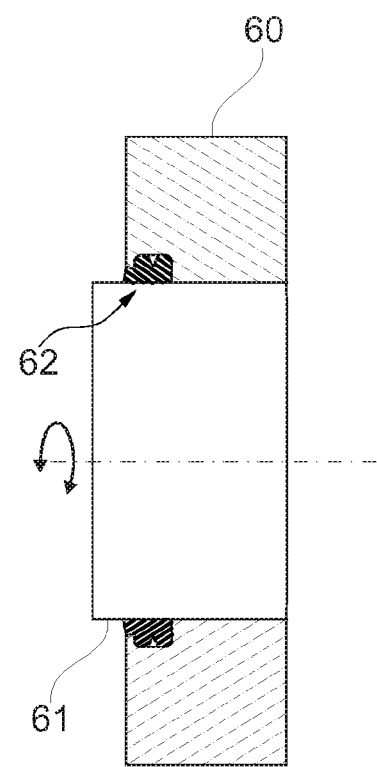

The gasket and seat system may also be arranged in a housing 60, for sealing off e.g. a shaft 61 having mounted thereon a shaft mounted element, see FIGS. 6a-b. In rotation of the shaft 61, element 60 rotates together with the shaft onto which it is mounted. However, element 61 is attached to shaft 60 in such a manner that it may move a predefined short distance in axial direction. Even in this case, the gasket 62 will ensure sealing according to the above given conditions concerning hygienic sealing and pressure durability. More precisely, in this case, the wall 17 facing the interior of the housing is angled away from a common point of engagement for the interior surface 26 and the wall 17. This increases the angle in the corner in order to prevent product from being retained in that area. The gasket 62 has also an inner and outer portion, as gasket 1, and a radial groove 63, which is easily perceivable from FIG. 6b. An axial movement of element 60 over a short distance in relation to shaft 61 is possible without degradation of the sealing capabilities of gasket 62. The gasket 62 may for instance be a radial sealing ring, shaft 61 and the element mounted thereon may be a shaft in a pump.

As mentioned above, the gasket may be self-retaining inside the seat, which simplifies the procedure of coupling the joint elements, e.g. pipes or union elements. Hence, a method of assembly a gasket and seat system is provided by the present invention, for sealing a joint of elements as described above. The method comprises the step of pre-mounting the gasket in one element of said joint that comprises the seat for the gasket. In this way the assembly of the system is facilitated, compared conventional gaskets, such as O-ring sealings that are not self-retaining and cause a complicated and expensive assembly of such systems.

Modifications to the specific design of the gasket or seat may be made without departing from the scope of the invention as defined in the appended claims.

The invention claimed is:

1. A gasket (1, 40, 41, 56, 62) and seat (2) system suitable for sealing a joint, wherein the gasket is made of a polymeric material, said gasket comprising:
an inner portion (10) having a wall (17) forming an inner diameter of the gasket, the wall (17) in contact with an interior and high pressure side of the joint, and an outer portion (11), arranged radially outside said inner portion, and said outer portion extends axially forming radial end walls (12, 13), wherein the inner portion (10) of the gasket (1) is formed with an angled wall (18) connected at the wall (17) and at one of the radial end walls (12, 13) so that the wall and angled wall are contiguous surfaces forming an angle, whereby the inner portion (10) increases in breadth from the outer portion (11) to the wall in contact with the interior and high pressure side (17) along the angled wall (18), wherein the angled wall (18) parallels a matching angled wall (25) of the seat (2).

2. The gasket (1, 40, 41,56) and seat (2) system according to claim 1, wherein the wall (17) facing the interior of the joint is adapted to be flush with an interior surface (26) of the joint when mounted in the seat (2).

3. The gasket (40, 41, 62) and seat system according to claim 1, wherein the wall (17) is angled slightly inwards from a common point of engagement for an interior surface (26).

4. The gasket (1, 40, 41, 56, 62) and seat (2) system according to claim 1, wherein the gasket (1) is formed with a groove (14) in the outer portion (11).

5. The gasket (1, 40, 41, 56, 62) and seat (2) system according to claim 1, wherein the radial end walls (12, 13) are compressed upon entry in the seat (2).

6. The gasket (1, 40, 41, 56) and seat (2) system according to claim 1, wherein a gasket surface (19) facing a flange plane (F) is adapted to be flush with the flange plane (F) after assembly.

7. The gasket (1, 40, 41, 56, 62) and seat (2) system according to claim 1, wherein the gasket (1) comprises silver ions, in order to obtain antiseptic properties.

8. The gasket (1, 40, 41) and seat (2) system according to claim 1, wherein said joint is a pipe coupling.

9. The gasket (1, 40, 41) and seat (2) system according to claim 8, wherein said pipe coupling comprises two flanges (3, 4), wherein the gasket is located in one of said flanges only, preferably pre-mounted in said one flange during assembly of said system.

10. The gasket (40, 41, 56) and seat (2) system according to claim 1, wherein said joint is installed in a pump housing of a pump for food processing or pharmaceutical product processing.

11. The gasket (1, 40, 41, 56, 62) and seat (2) system of claim 1, where the gasket and seat system coupling elements are adapted for food or pharmaceutical processing.

12. A gasket (1, 40, 41, 56, 62) of polymeric material adapted to seal a joint, said gasket comprising an inner portion (10), with a wall (17) forming an inner diameter of the gasket, the wall (17) in use in contact with an interior and a high pressure side of said joint, and an outer portion (11), which extends axially forming radial end walls (12, 13), wherein the inner portion (10) of the gasket (1) is formed with an angled wall (18) connected at the wall (17) and at one of the radial end walls (12, 13) such that the wall (17) and the angled wall (18) are contiguous surfaces forming an angle, whereby the inner portion (10) increases in breadth from the outer portion (11) to the wall in contact with the high pressure side (17), wherein the angled wall (18) parallels a matching angled wall (25) of a seat (2), and wherein the outer portion (11) comprises a groove (14) between the radial end walls (12, 13).

13. The gasket (1, 40, 41, 56, 62) according to claim 12, wherein said polymeric material is elastic and resilient and comprises preferably rubber materials such as EPDM, Viton®, VMQ, FPM, FKM and HNBR, thermoplastic materials, or compositions comprising such materials singly or in combination.

14. A method of assembling a gasket (1, 40, 41, 56, 62) and seat (2) system according to claim 1 for sealing a joint, comprising the steps of:

mounting said gasket (1, 40, 41, 56, 62) in one element (3) of said joint, said element comprising said seat (2); and
assembling said joint to create hygienic seal.

* * * * *